2 Sheets—Sheet 1.

J. J. TOWNSEND.

AUTOMATIC RECORDING COMPASS.

No. 11,380. Reissued Nov. 7, 1893.

Witnesses.
Jno. E. Parks
J. Henderson

Inventor.
John J. Townsend
by his attorney
Howard Pell.

2 Sheets—Sheet 2.

J. J. TOWNSEND.

AUTOMATIC RECORDING COMPASS.

No. 11,380. Reissued Nov. 7, 1893.

Witnesses.
Jno. E. Parker
J. Henderson

Inventor.
John J. Townsend.
by his attorney
Horace Pettit.

UNITED STATES PATENT OFFICE.

JOHN J. TOWNSEND, OF PORTSMOUTH, VIRGINIA, ASSIGNOR TO THE TOWNSEND MARINE INVENTION COMPANY, OF BALTIMORE, MARYLAND.

AUTOMATIC RECORDING-COMPASS.

SPECIFICATION forming part of Reissued Letters Patent No. 11,380, dated November 7, 1893.

Original No. 477,283, dated June 21, 1892. Application for reissue filed July 29, 1893. Serial No. 482,476.

*To all whom it may concern:*

Be it known that I, JOHN J. TOWNSEND, a citizen of the United States, residing at Portsmouth, in the county of Norfolk and State of Virginia, have invented certain new and useful Improvements in Automatic Recording-Compasses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mariners' compasses, and especially to those which record the movements of the compass-needle relative to the line of the vessel's keel, or, in other words, the courses sailed.

In carrying out my invention I avail myself of the art of photography, arranging suitable mechanism to cause a strip of sensitized paper to travel slowly under a narrow slot which is screened from the light at all but one spot by a moving disk or plate, itself containing a narrow slot arranged to cross the aforesaid slot and adapted to change the point of intersection at every movement, however slight, of the compass-needle. The result of this contrivance is that a continuous irregular line is photographed on the paper agreeing exactly with the movements of the vessel and forming when developed and fixed a permanent record of the courses she has run. In another application, Serial No. 403,968, I have described at length what I consider the best mode of reducing to practice this part of my invention. The present application is restricted to a time-recording device, in combination with this course-recorder. By means of suitable auxiliary devices the strip is marked at regular intervals of time, so that the record gives not only the directions run, but the time spent on each course.

Figure 1:
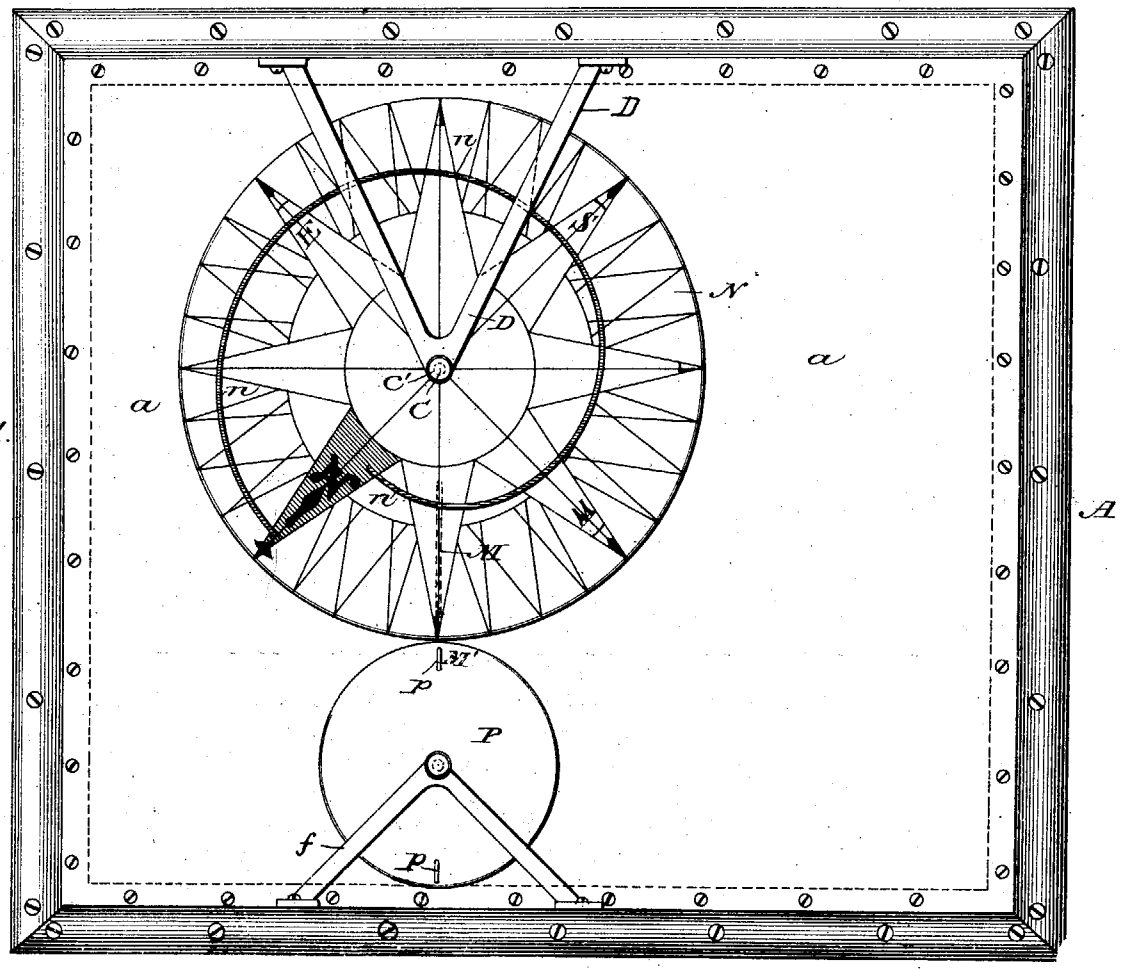
Figure 2:
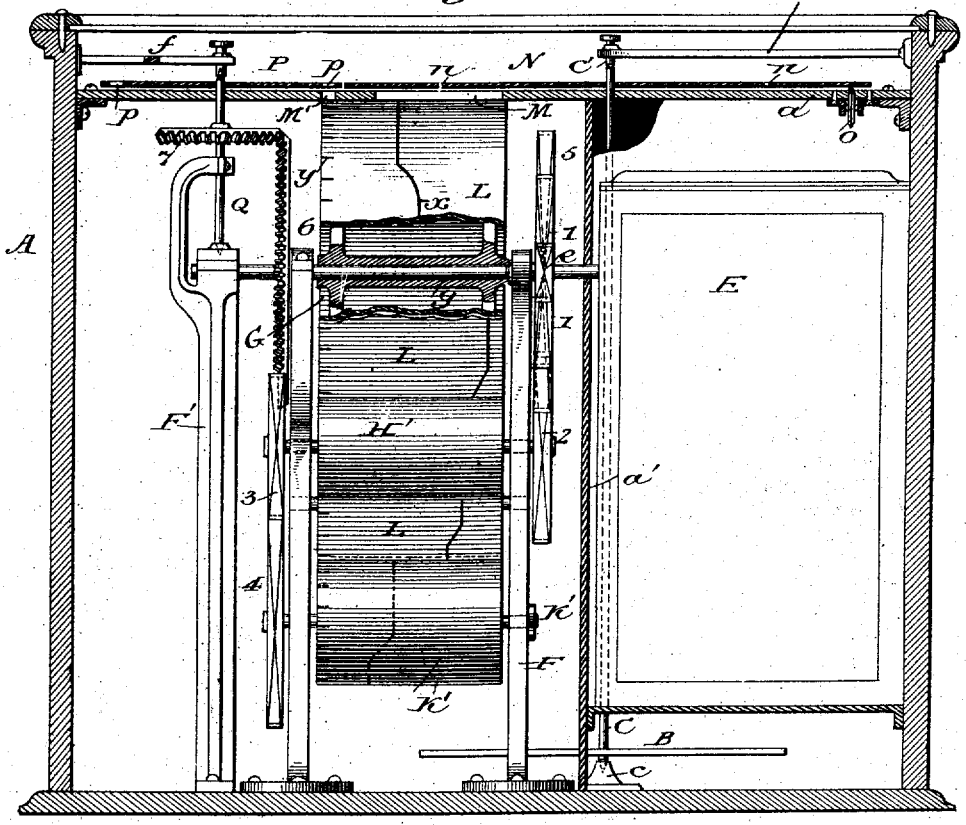

Figure 1 is a plan view and Fig. 2 is an end view, partly in section, of a recording-compass embodying my time-recorder.

In a suitable light-proof casing A, supported on gimbals, (not shown,) a magnetic needle, B, is mounted on a vertical spindle C, which is stepped in a conical bearing, $c$, and is steadied by an upper bearing, $c'$, preferably an adjustable screw passing through the end of the bracket, D. The needle is made of considerable length in order to give it a powerful leverage on the spindle and cause it to come to rest quicker when the course changes.

The casing A, is divided into three compartments by a horizontal diaphragm, $a$, a little below the bracket, D, and a vertical partition, $a'$, about midway of the casing, extending from the diaphragm, $a$, to the bottom of the casing. The lower edge of the partition may be cut away to permit the needle B, to swing freely, the spindle, C, being arranged near the partition, as shown. In the same compartment with the spindle is a motor, E, preferably a train of clockwork driven by a spring, as usual. The clock may be provided with a dial and hands, if desired, though this is not essential. An arbor of the clockwork extends through the partition, $a'$, and carries on its end a pinion, $e$, which meshes with a gear, 1, forming part of a train 1 2 3 4 5 6 7, suitably journaled in a frame, F. On the shaft to which the gears 5 6 are secured is mounted a large drum, G, by means of a sleeve, $g$, which turns freely on the shaft independently of the motion of the gears. Adjacent to the lower part of the drum, on either side, are pairs of guide-rollers, of which only one H′ is shown. Below the guide-rollers are the spools or reels, as K′, the latter having the gear 4 secured to its shaft. The delivery-spool is adapted to hold a roll of sensitized paper, L, of suitable width, which is led between the guide-rollers to the receiving-spool, K′, upon which it is wound by the clockwork, E, acting through the train of gears, $e$, 1, 2, and 3 upon the gear-wheel, 4, on the shaft of the receiving-spool. The guide-rollers hold the paper close to the face of the drum, which, together with the said rollers and the delivery-spool, is arranged to revolve easily and smoothly. Conical bearings may be used wherever they may be necessary, provided with means for taking up wear and lost motion. By means of the adjustable bearings, $k'$, the spools are adapted to be readily removed from the frame, when necessary.

The above-described arrangement of the gears is simply illustrative, since it is evident that they can be arranged in any suitable way and that a greater or less number may be used. The drum, G, may be secured to the shaft of the gears 5 6 and revolved at a regular speed by the clockwork, thereby feeding the paper at the same speed at all times. In this case the receiving-spool, K′, will have to be arranged to lessen its speed as the roll of paper increases in size. In the arrangement illustrated the spool revolves at a regular speed and the speed of the paper increases slightly by regular increments in proportion to the increasing diameter of the roll of paper. This, however, does not affect the accuracy of the record, as will appear herein after.

The top of the drum, G, lies near the diaphragm, *a*, its cylindrical face running parallel with said diaphragm. At the point of approximate tangency a narrow slot is cut in the diaphragm, *a*, said slot running parallel with the axis of the drum. It may extend from one edge of the drum to the other, but is preferably broken into two portions, M and M′, the latter being quite short and arranged near an edge of the drum, preferably the forward edge. It is evident that the light passing through these two slots, M, M′, will act upon the sensitized paper traveling beneath them and if uncontrolled would develop two bands, one wide and the other narrow. It is also evident that if the light is so controlled as to pass through one of the slots—say the short one—at regular intervals only, the paper will be marked by lines indicating predetermined periods of time, while if the longer slot can be screened by a movable apertured shutter controlled by the compass-needle and adapted to admit the light at a different point along the slot for every point on the compass-card, the paper will record in a broken line the movements of the shutter, and consequently of the compass-needle. In order to accomplish the latter result, I secure upon the spindle, C, above the diaphragm, *a*, a disk, N, preferably circular, its plane being perpendicular to the axis of the spindle. The disk is of such a diameter as to extend over and beyond the slot, M, and is adjusted close to the diaphragm, though not touching it, so as to exclude all light from the slot and yet be free to move without coming in contact with the diaphragm. It may be made of any suitable light yet stiff material, such as sheet-brass. Small easily-running anti-friction wheel, O, may be mounted in the diaphragm below the disk to keep it from dragging in case it should warp or sag. The disk is preferably graduated like a compass-card, either by lines engraved on its surface or by means of a printed sheet of paper cemented to it, or in any suitable manner.

A spiral slot, *n*, is cut in the disk, beginning and ending nearly on the same radial line, preferably corresponding with the north point of the card, or, as described in the application above referred to this slot, *n*, and the slots, M, M′, may be simply diaphanous lines. The radial distance of the slot from the center of the disk is of course different for every point on the compass, and the sum of these differences, represented by the space between the inner and the outer ends of the slot, is substantially the same as the length of the slot, M. The slot, *n*, will therefore constantly intersect the vertical plane of the slot, M, but at a different place for every point on the compass-card. At the point of intersection a small aperture is formed, through which a pencil of light can penetrate to the sensitized paper. The continuous movement of the paper causes the pencil of light to trace a line *x*, on the sensitized surface, the position of the line shifting laterally across the paper as the disk swings to and fro with the compass-needle.

Various devices may be employed to record upon the strip the intervals of time during which the strip is running—such, for instance, as a printing or puncturing wheel geared to the clock-work. I prefer to arrange a horizontal wheel, P, near the edge of the disk, N, and mount it upon a vertical shaft, Q, supported in bearings in the standard, F′, and steadied by an upper adjustable bearing, *f*. The shaft is provided with a bevel-gear 7, meshing with the gear 6. The wheel projects over the short slot, M′, in the diaphragm, and is timed to revolve once in a predetermined number of minutes. In the wheel are formed one or more short radial slots, *p*, adapted to register with the slot, M′. At the instant the two slots coincide, the light will pass through them and make an impression *y*, on the edge of the sensitized strip. Since these marks will recur at regular intervals of time, it is evident that the speed of the paper is immaterial and may vary or not without impairing the value of the record. By using more than one wheel, P, or by varying the shape of the openings, *p*, the time-record can be divided into hours, if desired. In the drawings the record is shown as marked at five-minute intervals.

When the record is to be inspected, the roll of marked paper is removed from the frame and fixed by suitable treatment.

In case the ordinary "blue-print" or ferro-prussiate paper is used, the record will be developed by a blue line on a white ground.

Having thus described my invention, what I claim, and desire to secure by Letters Patent, is—

1. A recording-compass comprising a magnetic needle, a spirally-slotted disk revolved thereby, a sensitized sheet, a motor arranged to move said sheet under the disk, and a time-recording device adapted to mark upon the sensitized sheet regular intervals of time, substantially as described.

2. In a recording-compass, the combination, with the magnetic needle, of a spirally-slotted disk revolved thereby, a strip of sensitized material adapted to be moved under the disk, a motor for causing the strip to move, and a wheel revolved by the motor at an even rate of speed and adapted to mark the record-strip at predetermined intervals of time, substantially as described.

3. In a recording-compass, the combination, with the casing A, having the diaphragm, *a*, slotted at M, M′, and the partition, *a*′, of the slotted disk, N, controlled by the magnetic needle, and the slotted wheel, P, revolved by clockwork at a regular speed, substantially as described.

4. In a recording-compass, the combination, with the spindle, C, and the needle, B, of the spirally-slotted disk, N, the clockwork, E, the drum, G, guide-rollers, the spools, the wheel, P, and the gears, 1, 2, 3, 4, 5, 6, and 7, substantially as described.

5. In a recording compass, the combination with a magnetic needle, of a fixed diaphragm having a straight diaphanous line provided thereon, a sensitized sheet and means for moving the same under the diaphanous line of such fixed diaphragm, an opaque disk secured to said magnetic needle and having a continuous spirally disposed diaphanous line provided in said disk forming a single turn with its respective ends in a line substantially radial to the axis of the disk, terminating on the same side of said axis, said ends separated from each other at a distance approximately equal to the required length of the diaphanous line in the fixed diaphragm, said spirally disposed diaphanous line intersecting the plane of the straight diaphanous line in said fixed diaphragm continuously at different points as the course sailed by the vessel changes and a time recording device adapted to mark upon the sensitized sheet at regular intervals, substantially as specified.

In testimony whereof I affix my signature in presence of two witnesses.

JOHN J. TOWNSEND.

Witnesses:
N. S. BOWE,
T. T. HARRIS.